United States Patent
Willis et al.

(10) Patent No.: US 10,447,638 B2
(45) Date of Patent: Oct. 15, 2019

(54) AUTOMATICALLY APPLYING DATA LOSS PREVENTION RULES DURING MIGRATION

(71) Applicant: Quest Software Inc., Aliso Viejo, CA (US)

(72) Inventors: Tom Willis, Madison, WI (US); Chad Lindley, Mt. Horeb, WI (US)

(73) Assignee: Quest Software Inc., Aliso Viejo, CA (US)

( * ) Notice: Subject to any disclaimer, the term of this patent is extended or adjusted under 35 U.S.C. 154(b) by 357 days.

(21) Appl. No.: 14/844,951

(22) Filed: Sep. 3, 2015

(65) Prior Publication Data

US 2017/0070464 A1    Mar. 9, 2017

(51) Int. Cl.
| | | |
|---|---|---|
| G06F 15/16 | (2006.01) | |
| H04L 12/58 | (2006.01) | |
| H04W 4/12 | (2009.01) | |
| H04L 29/06 | (2006.01) | |

(52) U.S. Cl.
CPC .......... H04L 51/22 (2013.01); H04L 63/0227 (2013.01); H04W 4/12 (2013.01)

(58) Field of Classification Search
CPC ....... H04L 51/22; H04L 63/0227; H04W 4/12
USPC ................................. 709/204–206
See application file for complete search history.

(56) References Cited

U.S. PATENT DOCUMENTS

| | | | | |
|---|---|---|---|---|
| 5,991,753 A * | 11/1999 | Wilde | ............... | G06F 17/30067 |
| 8,943,032 B1 * | 1/2015 | Xu | ................... | G06F 17/30079 |
| | | | | 707/661 |
| 9,912,625 B2 * | 3/2018 | Mutha | ..................... | H04L 51/08 |
| 2007/0226304 A1 * | 9/2007 | Virk | ..................... | G06Q 10/107 |
| | | | | 709/206 |
| 2010/0332401 A1 * | 12/2010 | Prahlad | ............. | G06F 17/30082 |
| | | | | 705/80 |
| 2012/0240238 A1 * | 9/2012 | Gates | ............... | H04N 21/41407 |
| | | | | 726/26 |
| 2014/0095324 A1 * | 4/2014 | Cabral | ................... | G06Q 30/08 |
| | | | | 705/14.71 |
| 2014/0149517 A1 * | 5/2014 | Greinhofer | ............. | H04L 51/22 |
| | | | | 709/206 |
| 2015/0381649 A1 * | 12/2015 | Schultz | ............... | H04L 63/1433 |
| | | | | 726/25 |
| 2016/0269329 A1 * | 9/2016 | Willis | ..................... | H04L 51/08 |

* cited by examiner

*Primary Examiner* — David R Lazaro
*Assistant Examiner* — Mariegeorges A Henry
(74) *Attorney, Agent, or Firm* — Kirton McConkie; Brian Tucker (57) ABSTRACT

Data loss prevention ("DLP") rules can be automatically applied to items during a migration. When a migration is performed, a migration engine may be configured with migration configuration settings which define the items to be migrated from the source system to the target system. The migration engine may also be configured with DLP configuration settings which define the type of items on which DLP should be performed. When the DLP configuration settings indicate that DLP should be applied to an item to be migrated, the migration engine routes the item to a DLP engine rather than directly migrating the item to the target system. After the DLP engine has processed the item, the DLP engine can return the processed item to the migration engine which in turn can migrate the processed item to the appropriate location in the target system.

20 Claims, 8 Drawing Sheets

AUTOMATICALLY APPLYING DATA LOSS PREVENTION RULES DURING MIGRATION

CROSS-REFERENCE TO RELATED APPLICATIONS

N/A

BACKGROUND

Email migration refers to a process of transferring emails from a mailbox in a source system to a corresponding mailbox in a target system. An email migration may be performed for various reasons including when a company switches over to a new email service provider, switches to a different platform (e.g., traditional vs. hosted), is acquired, etc. When an email migration is performed, it is typical to also migrate other content including tasks, calendar items, contacts, journals, instant messaging conversations, posted attachments, sticky notes, etc. For purposes of this specification, a migration should therefore be construed as including the transfer of email as well as other content that is oftentimes provided within an email solution. The term email should be construed to encompass not only traditional email but also other messaging formats used by group collaboration platforms that are increasingly being used in place of traditional email. For example, email should be construed to encompass group communications and their associated content within group collaboration platforms. In such cases, a group "mailbox" within a source system may be migrated to a group "mailbox" within a target system.

BRIEF SUMMARY

The present invention extends to methods, systems, and computer program products for automatically applying data loss prevention ("DLP") rules during a migration. When a migration is performed from a source system to a target system, a migration engine may be configured with migration configuration settings which define the items to be migrated from the source system as well as how such items are to be migrated to the target system. The migration engine may also be configured with DLP configuration settings which define the type of items on which DLP should be performed. When the DLP configuration settings indicate that DLP should be applied to an item to be migrated, the migration engine routes the item to a DLP engine rather than directly migrating the item to the target system. The DLP engine can be configured to perform DLP on the item in accordance with defined DLP rules. After the DLP engine has processed the item, the DLP engine can return the processed item to the migration engine which in turn can migrate the processed item to the appropriate location in the target system.

In one embodiment, the present invention is implemented as method for performing DLP processing on selected items during a migration of the items from a source system to a target system. An item associated with an account on a source system is accessed. Based on DLP configuration settings, it is determined whether the item should be subjected to DLP processing. When it is determined that the item should not be subjected to DLP processing, the item is migrated to the target system by storing the item in association with a corresponding account on the target system. When it is determined that the item should be subject to DLP processing, DLP processing is performed on the item to generate a processed item, and the processed item is migrated to the target system by storing the processed item in association with the corresponding account on the target system.

In another embodiment, the present invention is implemented as a method for migrating a mailbox from a source system to a target system. A migration engine accesses an email within a mailbox on the source system as part of a migration of the mailbox from the source system to the target system. Prior to migrating the email to a corresponding mailbox on the target system, the migration engine routes the email to a DLP engine. The DLP engine performs DLP processing on the email to generate a processed email. The migration engine then migrates the processed email to the corresponding mailbox on the target system.

In another embodiment, the present invention is implemented as a system comprising a migration engine configured to perform a migration from a source system to a target system based on migration configuration settings which define items that are to be migrated, and a DLP engine configured to perform DLP processing on items received from the migration engine during the migration. The migration engine is configured with DLP configuration settings that identify which of the items that are to be migrated are to be routed to the DLP engine for DLP processing prior to being migrated. For each item received from the migration engine, the DLP engine processes the item to generate a processed item and then returns the processed item to the migration engine for migration to the target system.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

In this specification, DLP should be construed generally as the process of examining an item to determine whether it contains sensitive content, and if so, performing some action to secure the sensitive content such as removing the content from the item, rendering the content inaccessible, or discarding the item. As an example, DLP can encompass the process of scanning emails obtained from a source system to identify whether the emails contain social security numbers, and if so, removing the social security numbers from the emails before migrating them to the target system.

Figure 1:
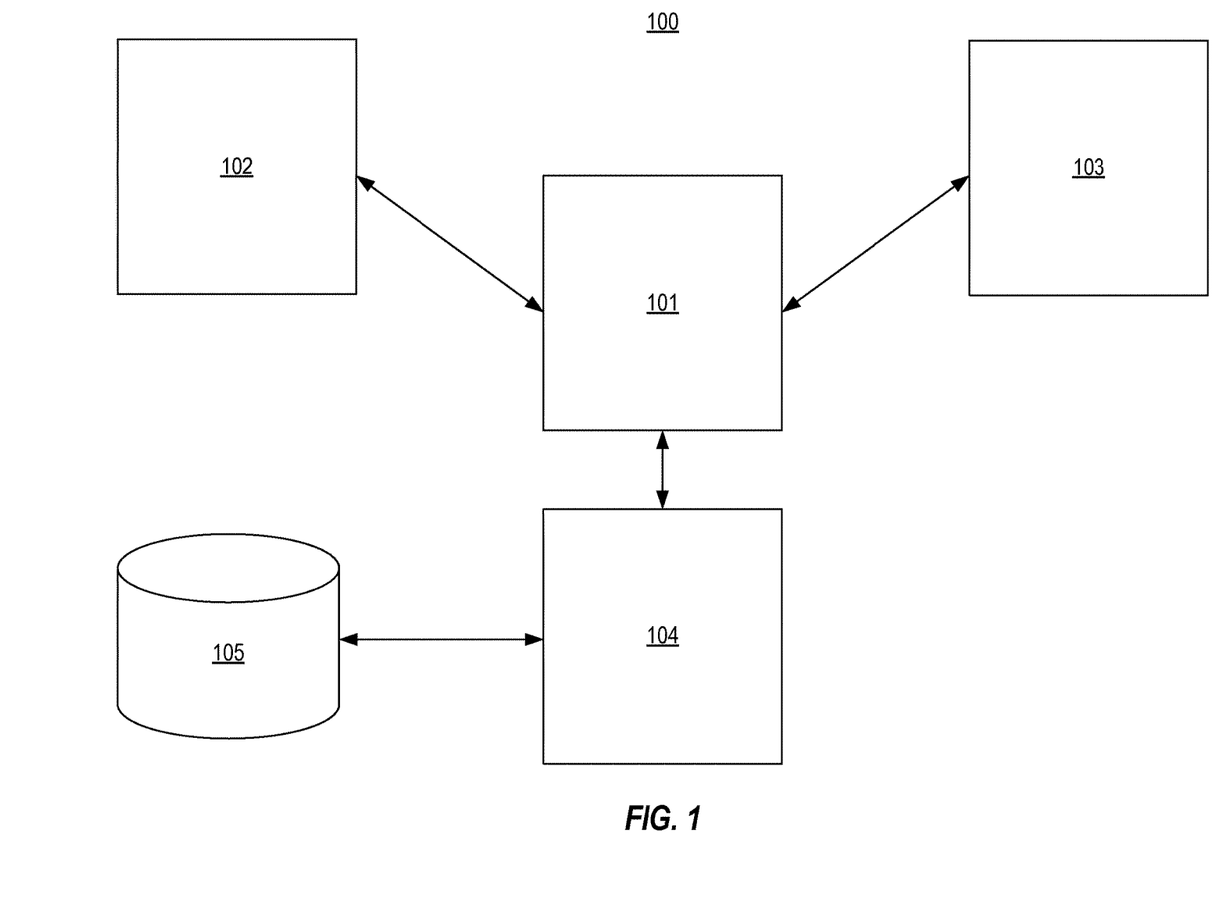
FIG. 1 illustrates an example environment in which a migration engine can perform a migration from a source system to a target system.

FIG. 1 illustrates an example environment 100 in which the present invention can be implemented. Environment 100 includes a migration engine 101 that is interposed between a source system 102 and a target system 103 in order to allow migration engine 101 to migrate content from source system 102 to target system 103. Both source system 102 and target system 103 can represent any type of system, and their connections with migration engine 101 can represent any type of connection.

Migration engine 101 is also coupled to a DLP engine 104. DLP engine 104 can be configured to perform the DLP process on items that it receives from migration engine 101. DLP engine 104 is shown as being coupled to a database 105 which defines DLP rules that DLP engine 104 can use to perform the DLP process. Database 105 can represent any construct used to store DLP rules for and/or provide DLP rules to DLP engine 104.

Figure 2A:
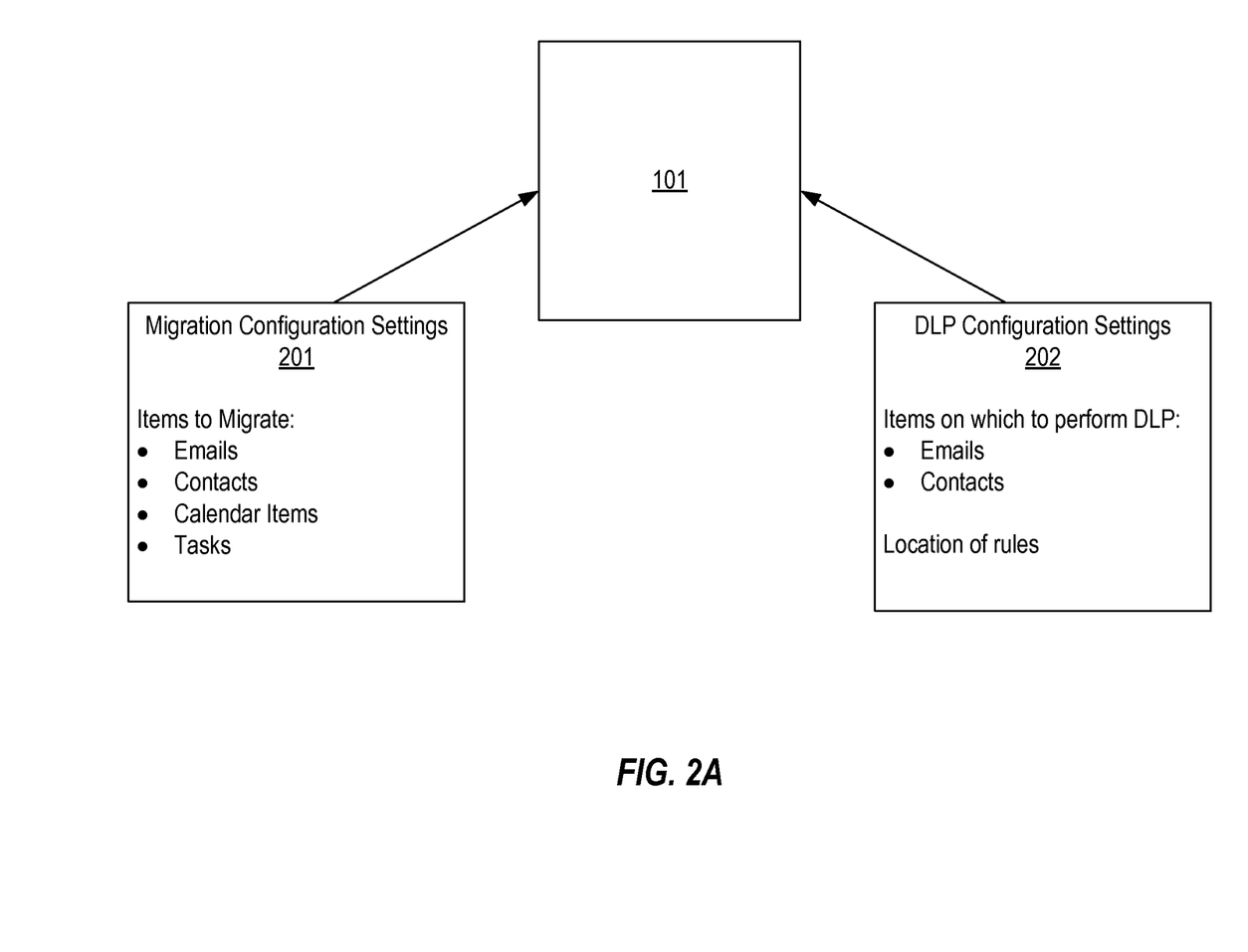
FIG. 2A illustrates an example of how a migration engine can be configured to perform a migration that includes applying DLP processing on selected items.

As shown in FIG. 2A, when a customer desires to migrate its email system from source system 102 to target system 103, the customer can specify migration configuration settings 201 as well as DLP configuration settings 202. Such settings 201, 202 can be used to configure migration engine 101 to appropriately migrate items to target system 103 including by selectively performing DLP on such items.

Migration configuration settings 201 can include any setting for specifying how items stored in source system 102 should be migrated to target system 103 including, for example, which items to migrate (e.g., emails, contacts, calendar items, tasks, journals, instant messaging conversations, posted attachments, sticky notes, etc.), how to create and/or link accounts in target system 103 based on the accounts stored in source system 102, which protocol(s) to use to perform the migration (e.g., Messaging Application Program Interface (MAPI) or Exchange Web Services (EWS)), etc. In contrast, DLP configuration settings 202 can include any setting for specifying which of the items to be migrated should be subject to DLP processing prior to being migrated. For example, DLP configuration settings 202 may specify that only emails and contacts should be subject to DLP processing while calendar items and tasks should not be subject to DLP processing. DLP configuration settings 202 may also specify which rules to use. For example, DLP configuration settings 202 could include an identifier or location of the appropriate rules to apply during a migration. DLP engine 104 can employ this identifier or location to obtain the appropriate rules from database 105.

Figure 2B:
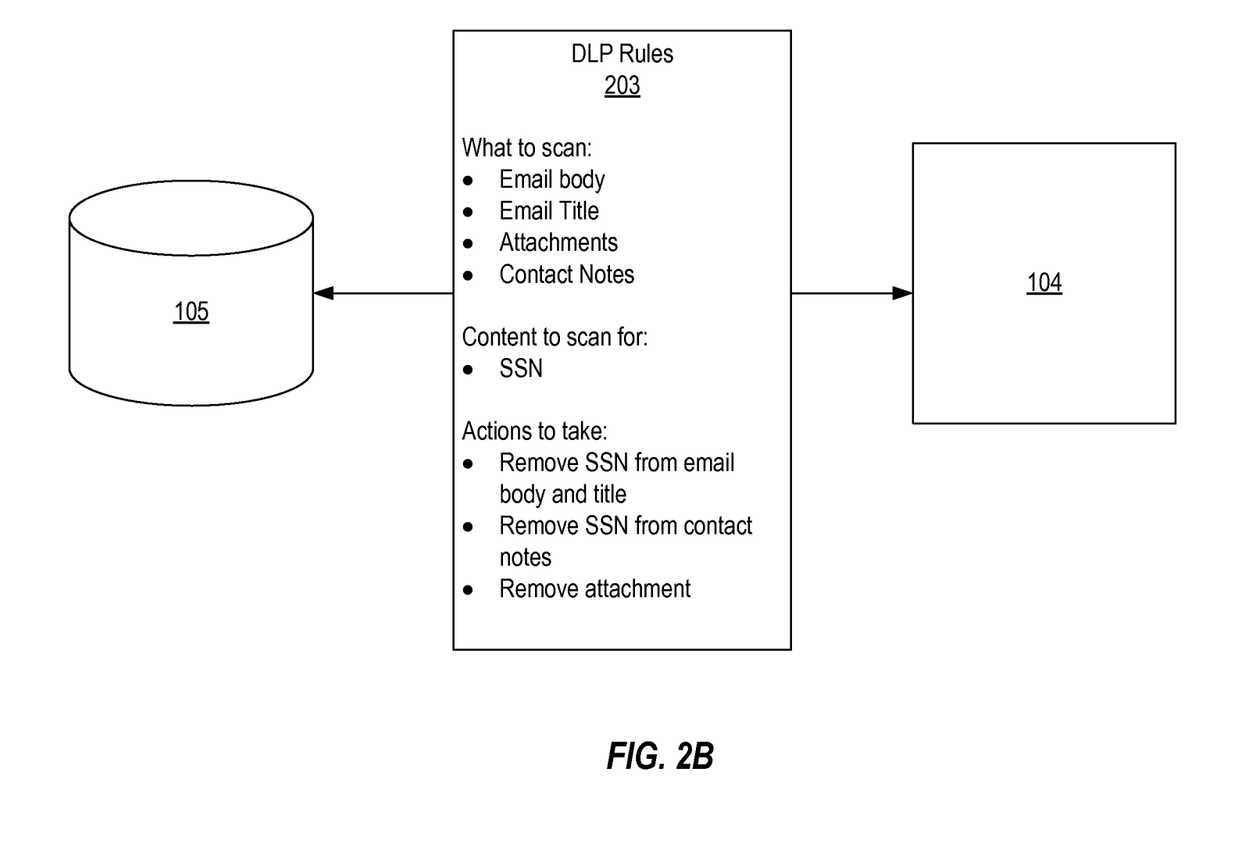
FIG. 2B illustrates an example of DLP rules that can be obtained by a DLP engine for use during a migration.

FIG. 2B illustrates an example of DLP rules 203 that can be obtained by DLP engine 104 for use during a migration. For example, based on DLP configuration settings 202, DLP engine 104 can access database 105 to obtain DLP rules 203. DLP rules 203 can specify a number of things including what portions of the content to scan (which may be all portions of the content), what to scan for, and what actions to take when sensitive content is found.

Figure 3A:
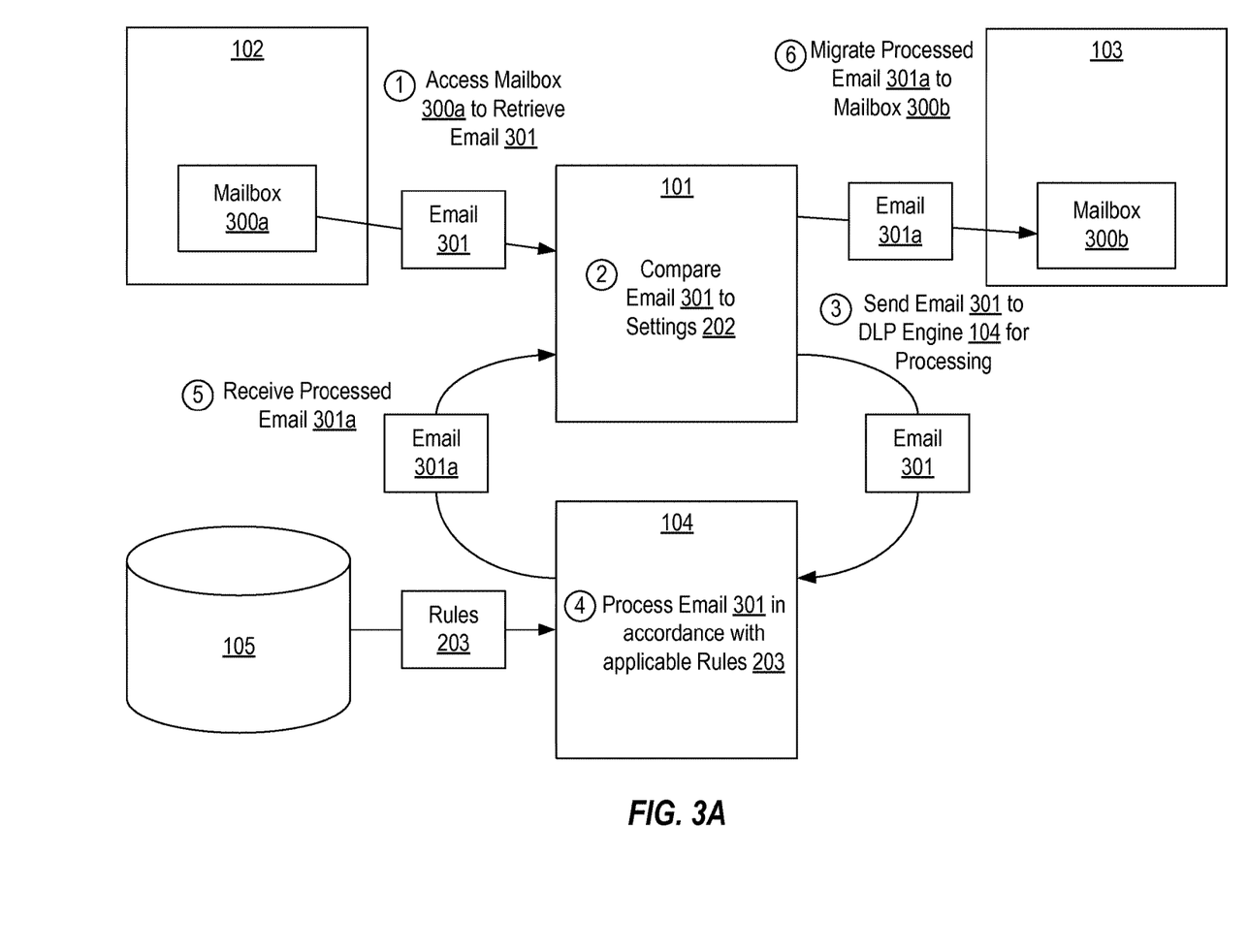
FIG. 3A illustrates a flowchart of how an email can be migrated in accordance with one or more embodiments of the present invention.

FIG. 3A provides a flowchart which illustrates an example of how an email can be processed during a migration in accordance with one or more embodiments of the present invention. In a first step, migration engine 101 accesses a mailbox 300a in source system 102. Mailbox 300a includes an email 301 that, based on migration configuration settings 201, should be migrated to target system 103. Accordingly, migration engine 101 retrieves email 301.

In a second step, migration engine 301 determines whether email 301 should be routed for DLP processing. For example, migration engine 101 may access DLP configuration settings 202 to determine whether the settings specify that email 301 should be subjected to DLP processing. In this example, DLP configuration settings 202 specify that all emails should be routed for DLP processing, and therefore, migration engine 101 may send email 301 to DLP engine 104. It is noted that this step of determining whether an item is to be subjected to DLP processing does not necessarily need to be performed individually on each item. For example, prior to commencing the migration of a mailbox, migration engine 101 can determine whether DLP configuration settings 202 specify that all email in the mailbox should be migrated. In such a case, migration engine 101 can directly route all email in the mailbox to DLP engine 104 for processing without performing an individual determination on each email.

In some embodiments, DLP configuration settings 202 may provide more granular criteria for determining whether a particular item should be subjected to DLP processing. For example, DLP configuration settings 202 may specify that only emails (or other content) that are stored on source system 102 within (or associated with) the mailboxes of specified users should be subjected to DLP processing. Similarly, DLP configuration settings 202 may specify that only emails (or other content) that are to be stored in (or associated with) specified mailboxes in target system 103 should be subjected to DLP processing.

In any case, whenever migration engine 101 determines that an item being migrated should be subjected to DLP processing, migration engine 101 can route the item to DLP engine 104. This is shown in step 3 of FIG. 3A.

In step 4, DLP engine 104 performs DLP processing on email 301 in accordance with the applicable rules. In this example, it is assumed that rules 203 are applicable to email 301. Accordingly, based on rules 203, DLP engine 104 can examine the body, title, and any attachments of email 301 to determine whether they include a social security number. If DLP engine 104 determines that email 301 includes a social security number, the appropriate action can be applied to email 301. For example, if the social security number is in the title or body of the email, the social security number can be redacted. Similarly, if the social security number is in an attachment, the attachment can be removed.

After email 301 has been processed (and any appropriate action taken), DLP engine 104 can return the processed email 301a to migration engine 101. Processed email 301a may be identical to email 301 if no action was required, or may be a modified version of email 301 if action was required. In either case, in step 6, migration engine 101 migrates processed email 301a to a corresponding mailbox 300b in target system 103. In this manner, migration engine 101 selectively applies DLP processing to items that it migrates.

Figure 3B:
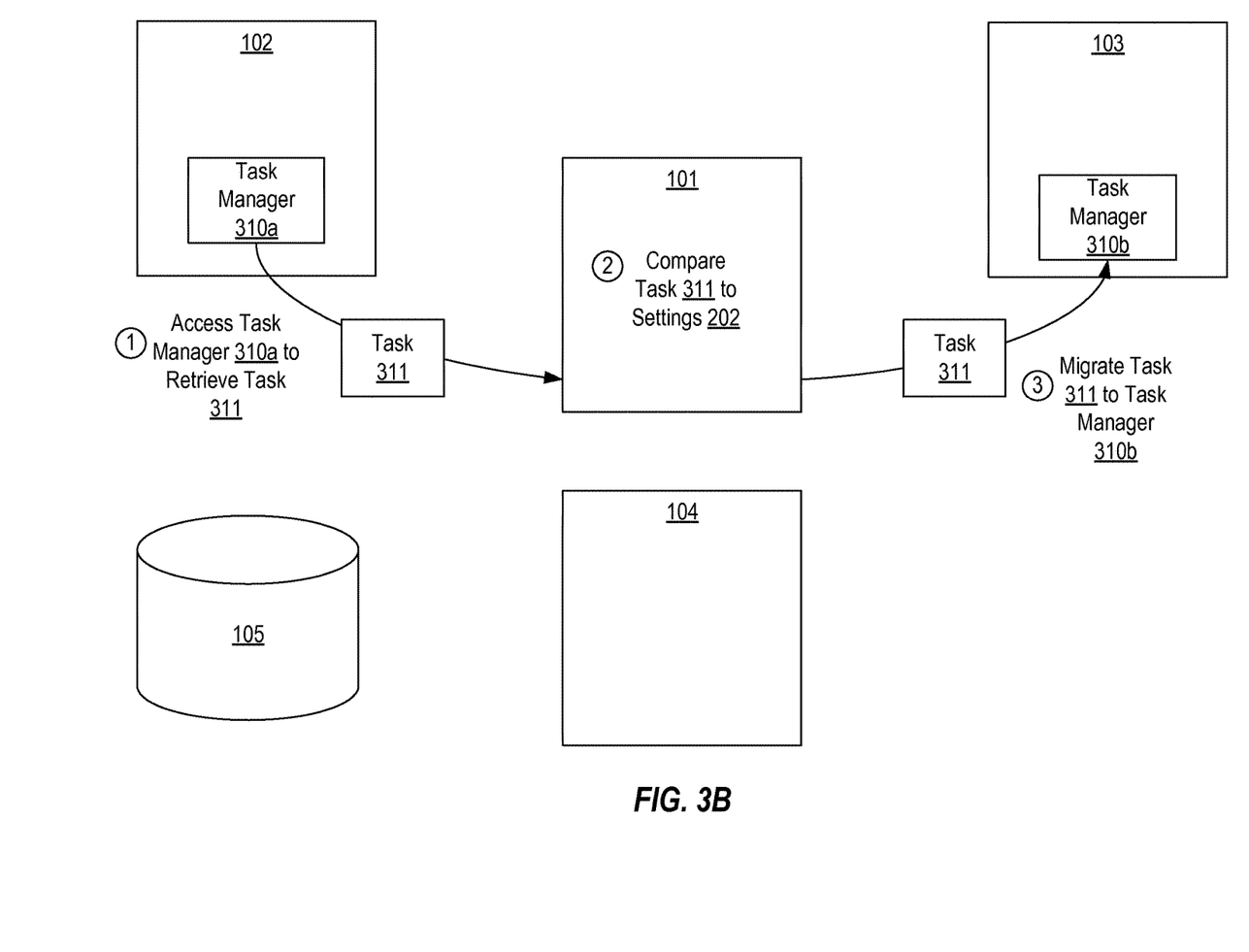
FIG. 3B illustrates a flowchart of how a task can be migrated in accordance with one or more embodiments of the present invention.

FIG. 3B provides a similar flowchart illustrating an example of how a task can be migrated in accordance with one or more embodiments of the present invention. In a first step, migration engine 101 accesses task manager 310a on source system 102. Task manager 310a includes a task 311 that, based on migration configuration settings 201, should be migrated to target system 103. Accordingly, migration engine 101 retrieves task 311.

In a second step, migration engine 301 determines whether task 311 should be routed for DLP processing. For example, migration engine 101 may access DLP configuration settings 202 to determine whether the settings specify that task 311 should be subjected to DLP processing. In this example, DLP configuration settings 202 specify that only emails and contacts should be routed for DLP processing, and therefore, migration engine 101 can determine that task 311 should not be routed to DLP engine 104. As was noted above, this step of determining whether an item is to be subjected to DLP processing does not necessarily need to be performed individually on each item. For example, prior to commencing the migration of task manager 310a, migration engine 101 can determine that DLP configuration settings 202 specify that no tasks should be subjected to DLP processing. Accordingly, migration engine 101 can directly migrate all tasks within task manager 310a without additional determination of whether DLP processing should be performed on such tasks.

In a third step, because it is determined that DLP processing should not be performed on task 311, migration engine 101 migrates task 311 to the corresponding task manager 310b on target system 103 without first sending task 311 to DLP engine 104.

In some embodiments, migration engine 101 and/or DLP engine 104 can be configured to generate information about a DLP action that is taken on a particular item. For example, when the processing of an item results in the item being modified in some manner, DLP engine 104 (or equally migration engine 101) can create an entry in an audit log and/or notify an administrator of the action taken.

Figure 4A:
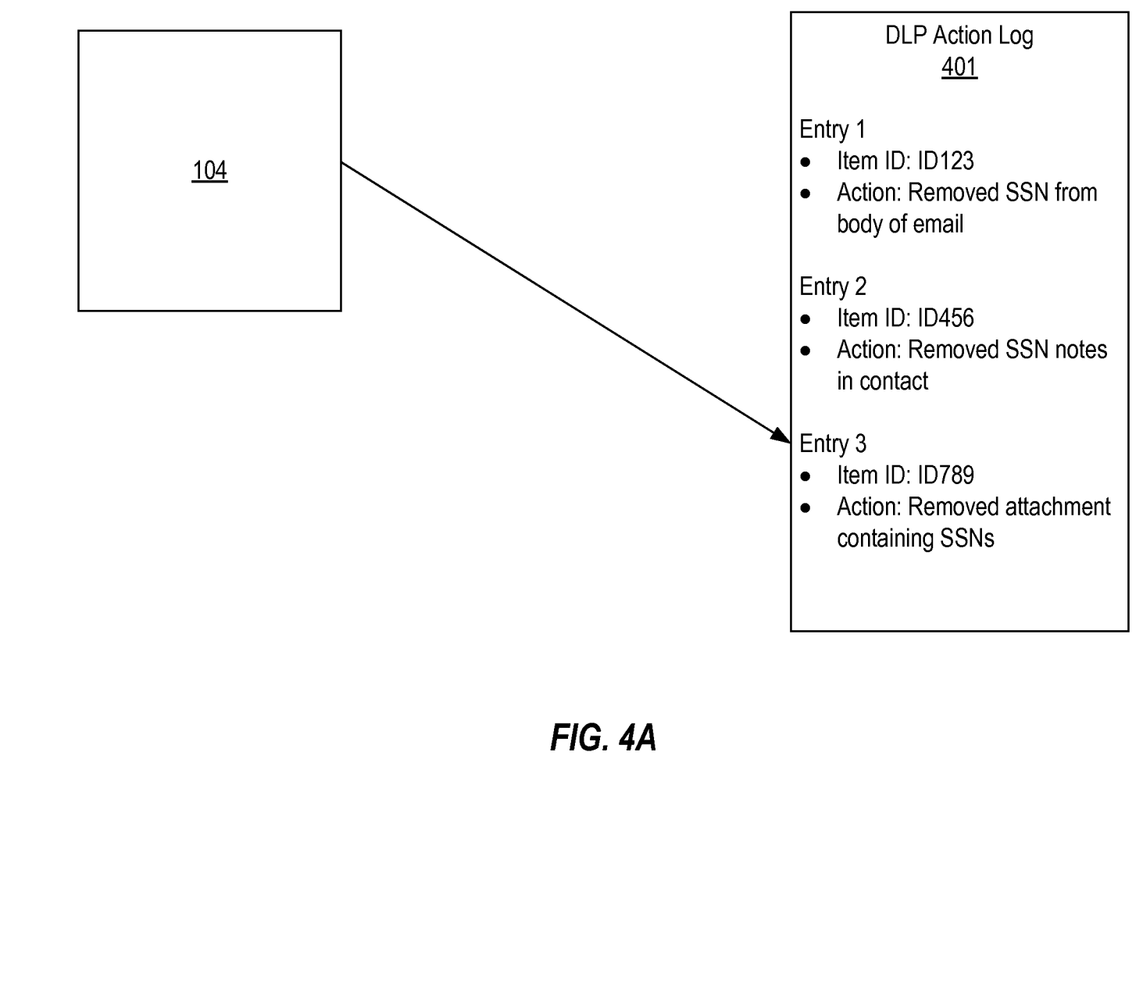
FIG. 4A illustrates how a log can be updated when a DLP action is taken on an item during a migration.

FIG. 4A illustrates an example of how DLP engine 104 can add an entry to a DLP action log 401 when an action is taken on an item. As shown, DLP engine 104 is in the process of writing a third entry to log 401 indicating that an attachment was removed from an item having an ID of ID789 because the item (which in this case is assumed to be an email) included an attachment listing social security numbers. DLP action log 401 is also shown as including two previous entries indicating that an action was taken on items having IDs of ID123 and ID456. In this way, DLP engine 104 can summarize the actions that it takes on items during the migration.

Figure 4B:
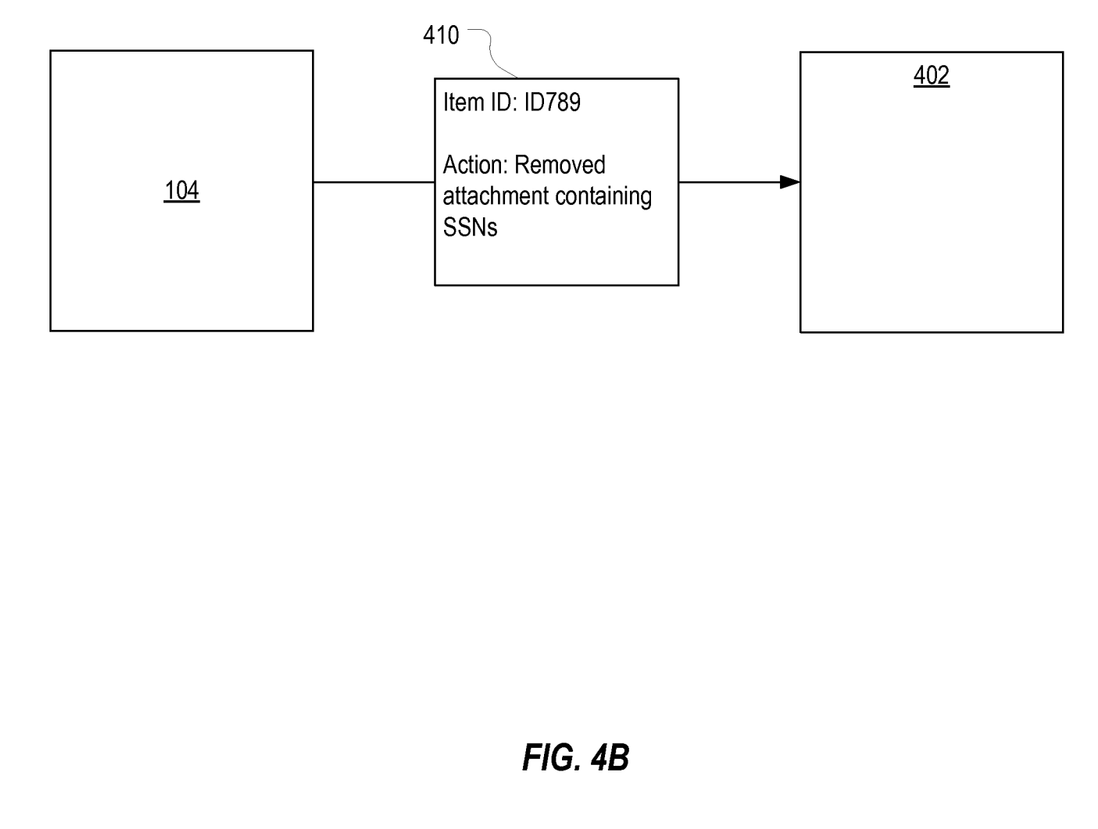
FIG. 4B illustrates how an administrator can be notified when a DLP action is taken on an item during a migration.

FIG. 4B illustrates an example of how DLP engine 104 can notify an administrator that an action was taken on an item. In this example, an email 410, containing information about the action, is shown as being sent by DLP engine 104 to an administrator system 402. In this way, an administrator can review email 410 to identify the potential breach in security/policy and take appropriate action. Accordingly, an administrator can be quickly notified of the actions taken during DLP processing which may in turn allow the administrator to make appropriate adjustments during the migration process (e.g., by tightening or loosening the DLP rules) or to address potential concerns with a company's security policies.

The application of DLP processing during a migration provides a number of advantages over known DLP processing techniques. For example, because the DLP processing occurs during a migration, the process is not limited to the email transport layer (i.e., to emails that are being sent). Therefore, using the techniques of the present invention, all items stored within (or associated with) a mailbox can be subjected to DLP processing even though such items may have already been sent or may never be sent. As mentioned above, the present invention may also be employed to perform DLP processing during the migration of non-traditional email items such as group communications and their associated content.

Figure 5:
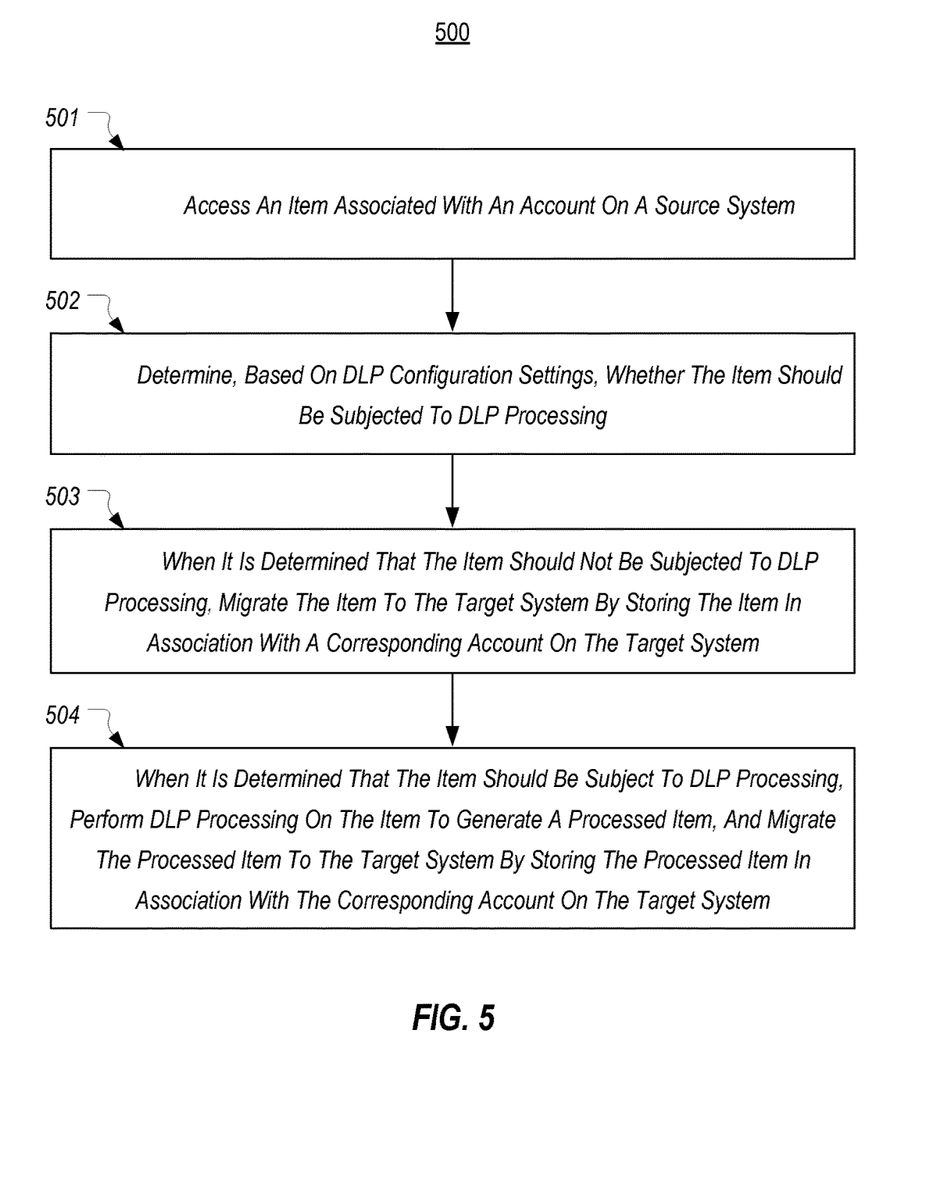
FIG. 5 provides a flowchart of an example method for performing DLP processing on selected items during a migration of the items from a source system to a target system.

FIG. 5 provides a flowchart of an example method 500 for performing DLP processing on selected items during a migration of the items from a source system to a target system. Method 500 can be performed by a system that includes a migration engine such as migration engine 101 and a DLP engine such as DLP engine 104.

Method 500 includes an act 501 of accessing an item associated with an account on a source system. For example, migration engine 101 can access email 301 within mailbox 300a on source system 102. Similarly, migration engine 101 can access task 311 within task manager 310a on source system 102.

Method 500 includes an act 502 of determining, based on DLP configuration settings, whether the item should be subjected to DLP processing. For example, migration engine 101 can determine whether DLP configuration settings 202 define that email 301 or task 211 should be subjected to DLP processing.

Method 500 includes an act 503 of migrating the item to the target system by storing the item in association with a corresponding account on the target system when it is determined that the item should not be subjected to DLP processing. For example, migration engine 101 can determine that task 311 should not be subjected to DLP processing and can migrate task 311 to task manager 310b on target system 103.

Method 500 includes an act 504 of performing DLP processing on the item to generate a processed item and migrating the processed item to the target system by storing the processed item in association with the corresponding account on the target system when it is determined that the item should be subject to DLP processing. For example, migration engine 101 can determine that email 301 should be subjected to DLP processing and can route email 301 to DLP engine 104 for processing. In response, DLP engine 104 can return a processed email 301a to migration engine 101 which is then migrated to mailbox 300b on target system 103.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a system that includes one or more processors and computer executable instructions which implement a migration engine and a data loss prevention (DLP) engine when executed by at least one of the one or more processors, for performing DLP processing on selected items during an email migration from a source system to a target system, the method comprising:
    accessing, by the migration engine and as part of the email migration, a first email that is stored in a first mailbox that corresponds to a first user on the source system;
    processing, by the migration engine, the first email to determine, based on DLP configuration settings that define rules for protecting against loss, misuse or unauthorized access of sensitive data, whether the first email should be subjected to the DLP processing;
    upon determining, based on the DLP configuration settings, that the first email should not be subjected to the DLP processing, migrating, by the migration engine, the first email to the target system without routing the first email to the DLP engine by storing the first email in a first mailbox that corresponds to the first user on the target system;
    accessing, by the migration engine and as part of the email migration, a second email that is stored in the first mailbox that corresponds to the first user on the source system;
    processing, by the migration engine, the second email to determine, based on the DLP configuration settings, whether the second email should be subjected to the DLP processing;
    upon determining, based on the DLP configuration settings, that the second email should be subject to the DLP processing, routing, by the migration engine, the second email to the DLP engine rather than migrating the second email to the target system;
    performing, by the DLP engine, the DLP processing on the second email to generate a processed version of the second email, wherein performing the DLP processing on the second email to generate the processed version of the second email comprises removing sensitive data from the second email to ensure that the sensitive data is not lost, misused or accessed by unauthorized users once the processed version of the second email is migrated to the target system;
    providing, by the DLP engine, the processed version of the second email to the migration engine; and
    migrating, by the migration engine, the processed version of the second email, rather than the second email, to the target system by storing the processed version of the second email in the first mailbox that corresponds to the first user on the target system.

2. The method of claim 1, further comprising:
    accessing, by the migration engine and as part of the email migration, a third email that is stored in a second mailbox that corresponds to a second user on the source system;
    processing, by the migration engine, the third email to determine, based on the DLP configuration settings, whether the third email should be subjected to the DLP processing;
    upon determining, based on the DLP configuration settings, that the third email should not be subjected to the DLP processing, migrating, by the migration engine, the third email to the target system without routing the third email to the DLP engine by storing the third email in a second mailbox that corresponds to the second user on the target system;
    accessing, by the migration engine and as part of the email migration, a fourth email that is stored in the second mailbox that corresponds to the second user on the source system;
    processing, by the migration engine, the fourth email to determine, based on the DLP configuration settings, whether the fourth email should be subjected to the DLP processing;
    upon determining, based on the DLP configuration settings, that the fourth email should be subject to the DLP processing, routing, by the migration engine, the fourth email to the DLP engine rather than migrating the fourth email to the target system;
    performing, by the DLP engine, the DLP processing on the fourth email to generate a processed version of the fourth email;
    providing, by the DLP engine, the processed version of the fourth email to the migration engine; and
    migrating, by the migration engine, the processed version of the fourth email, rather than the fourth email, to the target system by storing the processed version of the fourth email in the second mailbox that corresponds to the second user on the target system.

3. The method of claim 1, further comprising:
    accessing, by the migration engine and as part of the email migration, a first item that is stored in association with the first mailbox of the first user on the source system, the first item comprising one of a contact, a task, a calendar item, a journal, an instant messaging conversation, a posted attachment, or a sticky note;
    processing, by the migration engine, the first item to determine, based on the DLP configuration settings, whether the first item should be subjected to the DLP processing;
    upon determining, based on the DLP configuration settings, that the first item should not be subjected to the DLP processing, migrating, by the migration engine, the first item to the target system without routing the first item to the DLP engine by storing the first item in association with the first mailbox of the first user on the target system;

accessing, by the migration engine and as part of the email migration, a second item that is stored in the second mailbox that corresponds to the second user on the source system;

processing, by the migration engine, the second item to determine, based on the DLP configuration settings, whether the second item should be subjected to the DLP processing;

upon determining, based on the DLP configuration settings, that the second item should be subject to the DLP processing, routing, by the migration engine, the second item to the DLP engine rather than migrating the second item to the target system;

performing, by the DLP engine, the DLP processing on the second item to generate a processed version of the second item;

providing, by the DLP engine, the processed version of the second item to the migration engine; and migrating, by the migration engine, the processed version of the second item, rather than the second item, to the target system by storing the processed version of the second item in association with the first mailbox of the first user on the target system.

4. The method of claim 3, wherein the DLP configuration settings define which type of items are to be subjected to the DLP processing.

5. The method of claim 1, wherein the DLP configuration settings define that emails associated with one or more particular users should be subjected to the DLP processing.

6. The method of claim 1, wherein the DLP configuration settings identify DLP rules that are to be used when performing the DLP processing.

7. The method of claim 1, wherein removing sensitive data from the second email comprises redacting the sensitive data.

8. The method of claim 1, wherein removing sensitive data from the second email comprises one of:
removing content from the body of the second email; or
removing an attachment from the second email.

9. The method of claim 1, further comprising:
adding an entry to a log that describes that sensitive data was removed from the second email.

10. The method of claim 1, further comprising:
generating and sending a notification that describes that sensitive data was removed from the second email.

11. The method of claim 1, wherein performing the DLP processing on the second email to generate the processed version of the second email comprises comparing content of the second email to DLP rules.

12. The method of claim 11, wherein the DLP rules define one or more actions to take on the second email when the second email contains specified content.

13. The method of claim 12, wherein removing the sensitive data comprises one or more of removing an attachment to the second email or removing content within a body or title of the second email.

14. The method of claim 1, wherein the second email comprises a group communication.

15. One or more computer storage media storing computer executable instructions which implement a migration engine and a data loss prevention (DLP) engine when executed by at least one processor, the migration engine and the DLP engine being configured to implement a method for performing DLP processing on selected items during an email migration from a source system to a target system, the method comprising:

accessing, by the migration engine and as part of the email migration, a first email that is stored in a first mailbox that corresponds to a first user on the source system;

processing, by the migration engine, the first email to determine, based on DLP configuration settings that define rules for protecting against loss, misuse or unauthorized access of sensitive data, whether the first email should be subjected to the DLP processing;

upon determining, based on the DLP configuration settings, that the first email should not be subjected to the DLP processing, migrating, by the migration engine, the first email to the target system without routing the first email to the DLP engine by storing the first email in a first mailbox that corresponds to the first user on the target system;

accessing, by the migration engine and as part of the email migration, a second email that is stored in the first mailbox that corresponds to the first user on the source system;

processing, by the migration engine, the second email to determine, based on the DLP configuration settings, whether the second email should be subjected to the DLP processing;

upon determining, based on the DLP configuration settings, that the second email should be subject to the DLP processing, routing, by the migration engine, the second email to the DLP engine rather than migrating the second email to the target system;

performing, by the DLP engine, the DLP processing on the second email to generate a processed version of the second email, wherein performing the DLP processing on the second email to generate the processed version of the second email comprises removing sensitive data from the second email to ensure that the sensitive data is not lost, misused or accessed by unauthorized users once the processed version of the second email is migrated to the target system;

providing, by the DLP engine, the processed version of the second email to the migration engine; and migrating, by the migration engine, the processed version of the second email, rather than the second email, to the target system by storing the processed version of the second email in the first mailbox that corresponds to the first user on the target system.

16. The computer storage media of claim 15, wherein the method further comprises:

accessing, by the migration engine and as part of the email migration, a first item that is stored in association with the first mailbox of the first user on the source system, the first item comprising one of a contact, a task, a calendar item, a journal, an instant messaging conversation, a posted attachment, or a sticky note;

processing, by the migration engine, the first item to determine, based on the DLP configuration settings, whether the first item should be subjected to the DLP processing;

upon determining, based on the DLP configuration settings, that the first item should not be subjected to the DLP processing, migrating, by the migration engine, the first item to the target system without routing the first item to the DLP engine by storing the first item in association with the first mailbox of the first user on the target system;

accessing, by the migration engine and as part of the email migration, a second item that is stored in the second mailbox that corresponds to the second user on the source system;

processing, by the migration engine, the second item to determine, based on the DLP configuration settings, whether the second item should be subjected to the DLP processing;

upon determining, based on the DLP configuration settings, that the second item should be subject to the DLP processing, routing, by the migration engine, the second item to the DLP engine rather than migrating the second item to the target system;

performing, by the DLP engine, the DLP processing on the second item to generate a processed version of the second item;

providing, by the DLP engine, the processed version of the second item to the migration engine; and migrating, by the migration engine, the processed version of the second item, rather than the second item, to the target system by storing the processed version of the second item in association with the first mailbox of the first user on the target system.

17. The computer storage media of claim 15, wherein the DLP configuration settings define that emails associated with one or more particular users should be subjected to the DLP processing.

18. The computer storage media of claim 15, wherein removing sensitive data from the second email comprises one of:
  removing content from the body of the second email; or
  removing an attachment from the second email.

19. A method, implemented by a system that includes one or more processors and computer executable instructions which implement a migration engine and a data loss prevention (DLP) engine when executed by at least one of the one or more processors, for performing DLP processing on selected items during an email migration from a source system to a target system, the method comprising:
  accessing, by the migration engine and as part of the email migration, a first email that is stored in a first user's inbox on the source system;
  processing, by the migration engine, the first email to determine, based on DLP configuration settings that define rules for protecting against loss, misuse or unauthorized access of sensitive data, whether the first email should be subjected to the DLP processing;
  upon determining, based on the DLP configuration settings, that the first email should not be subjected to the DLP processing, migrating, by the migration engine, the first email to the target system without routing the first email to the DLP engine by storing the first email in an inbox that has been created for the first user on the target system;
  accessing, by the migration engine and as part of the email migration, a second email that is stored in the first user's inbox on the source system;
  processing, by the migration engine, the second email to determine, based on the DLP configuration settings, whether the second email should be subjected to the DLP processing;
  upon determining, based on the DLP configuration settings, that the second email should be subject to the DLP processing, routing, by the migration engine, the second email to the DLP engine rather than migrating the second email to the target system;
  performing, by the DLP engine, the DLP processing on the second email to generate a processed version of the second email, wherein performing the DLP processing on the second email to generate the processed version of the second email comprises removing sensitive data from the second email to ensure that the sensitive data is not lost, misused or accessed by unauthorized users once the processed version of the second email is migrated to the target system;
  providing, by the DLP engine, the processed version of the second email to the migration engine; and
  migrating, by the migration engine, the processed version of the second email, rather than the second email, to the target system by storing the processed version of the second email in the inbox that has been created for the first user on the target system.

20. The method of claim 19, further comprising:
accessing, by the migration engine and as part of the email migration, a first item that is stored in association with the first user's inbox on the source system, the first item comprising one of a contact, a task, a calendar item, a journal, an instant messaging conversation, a posted attachment, or a sticky note;

processing, by the migration engine, the first item to determine, based on the DLP configuration settings, whether the first item should be subjected to the DLP processing;

upon determining, based on the DLP configuration settings, that the first item should not be subjected to the DLP processing, migrating, by the migration engine, the first item to the target system without routing the first item to the DLP engine by storing the first item in association with the inbox that has been created for the first user on the target system;

accessing, by the migration engine and as part of the email migration, a second item that is stored in association with the first user's inbox on the source system;

processing, by the migration engine, the second item to determine, based on the DLP configuration settings, whether the second item should be subjected to the DLP processing;

upon determining, based on the DLP configuration settings, that the second item should be subject to the DLP processing, routing, by the migration engine, the second item to the DLP engine rather than migrating the second item to the target system;

performing, by the DLP engine, the DLP processing on the second item to generate a processed version of the second item;

providing, by the DLP engine, the processed version of the second item to the migration engine; and migrating, by the migration engine, the processed version of the second item, rather than the second item, to the target system by storing the processed version of the second item in association with the inbox that has been created for the first user on the target system.

* * * * *